(12) United States Patent
Meng

(10) Patent No.: US 6,519,532 B2
(45) Date of Patent: Feb. 11, 2003

(54) METHOD AND APPARATUS FOR 3D DEPTH MIGRATION

(75) Inventor: Zhaobo Meng, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 105 days.

(21) Appl. No.: 09/884,307

(22) Filed: Jun. 19, 2001

(65) Prior Publication Data

US 2002/0103602 A1 Aug. 1, 2002

Related U.S. Application Data

(60) Provisional application No. 60/265,255, filed on Jan. 31, 2001.

(51) Int. Cl.[7] .................................................. G01V 1/28
(52) U.S. Cl. ....................................................... 702/17
(58) Field of Search ........................ 702/17, 14; 367/73, 367/50, 51

(56) References Cited

U.S. PATENT DOCUMENTS 5,243,563 A * 9/1993 Kim ............................. 367/50
5,999,488 A   12/1999 Smith .......................... 367/50
6,317,695 B1 * 11/2001 Zhou et al. .................... 702/17

OTHER PUBLICATIONS

Hale, D., 3–D Depth Migration via McCellan Transformations, Geophysics, vol. 56, No. 11 (Nov. 1991): P. 1778–1785.

Gazdag et al., Migration of Seismic Data by Phase Shift Plus Interpolation, Geophysics, vol. 49, No. 2 (Feb. 1984): P. 124–131.

Hale, D., Stable Explicit Depth Extrapolation of Seismic Wavefields, Geophysics, vol. 56, No. 11 (Nov. 1991): P. 1770–1777.

* cited by examiner

Primary Examiner—Donald E. McElheny, Jr.
(74) Attorney, Agent, or Firm—Ryan N. Cross

(57) ABSTRACT

A method for imaging seismic data and eliminating noise and error in the resulting image is disclosed. In this method seismic data that has undergone downward extrapolation is corrected by applying Li-correction at regular depth intervals. The Li-correction is applied using Phase Shift Plus Interpolation Techniques. In a preferred embodiment tapering is applied during the Li-correction to further eliminate noise associated with large dips.

6 Claims, 3 Drawing Sheets

METHOD AND APPARATUS FOR 3D DEPTH MIGRATION

This application claims the benefit of U.S. Provisional Application No. 60/265,255 filed Jan. 31, 2001.

The present invention relates to migration of seismic reflections performed in a high-speed digital computer, and more particularly to modeling and imaging seismic wave propagation in the earth using Hale-McClellan wave propagation computations.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain or another energy source having capacity for delivering a series of impacts or mechanical vibrations to the earth's surface. Offshore, air gun sources and hydrophone receivers are commonly used. The acoustic waves generated in the earth by these sources are transmitted back from strata boundaries and reach the surface of the earth at varying lengths of time, depending on the distance and the characteristics of the subsurface the waves traveled. These returning waves are detected by geophones, which function to transduce such acoustic waves into representative electrical signals. In use, geophones are generally laid out along a line to form a series of observation stations within a desired locality, the source injects acoustic signals into the earth, and the detected signals are recorded for later processing using digital computers where the data are generally quantized as digital sample points such that each sample point may be operated on individually. Accordingly, seismic field records are reduced to vertical and horizontal cross sections which approximate subsurface features. The geophone array is then moved along the line to a new positions and the process repeated to provide a seismic survey. More recently seismic surveys involve geophones and sources laid out in generally rectangular grids covering an area of interest so as to expand areal coverage and enable construction of three dimensional (3D) views of reflector positions over wide areas.

As oil and gas production from known reservoirs and producing provinces declines, explorationists seek new areas in which to find hydrocarbons. Many of the new areas under exploration contain complex geological structures that are difficult to image with 2D techniques. Accordingly, 3D seismic processing has come into common use for mapping subterranean structures associated with oil and gas accumulations. Geophysicists, however, are well aware that a 2D seismic record section or 3D view is not a true reflectivity from the earth, but is instead a transformation of the earth's reflectivity into a plane where each recorded event is located vertically beneath the source/receiver midpoint. Steep dip, curved surfaces, buried foci, faults and other discontinuities in subterranean structure each contribute their unique characteristics to the seismic record and, in complexly faulted and folded areas, make interpretation of the geological layering from the seismic record extremely difficult.

Migration is the inverse transformation that carries the plane recorded events into a true 3D reflectivity of the earth, thereby placing reflections from dipping beds in their correct location and collapsing diffractions. Of the various available migration methods, wave equation migration is considered to be superior because it is based on accurate propagation of seismic waves through complex models of the earth. Seismic migration consists of two steps; first, wave extrapolation and, second, imagining. Downward extrapolation results in a wave field that is an approximation to the one that would have been recorded if both sources and recorders had been located a depth z. Wave extrapolation complexity depends largely on the migration velocity function. Whereas imaging represents little problem, the wave extrapolation can be quite complex where there are lateral velocity variations. These difficulties are particularly egregious in 3D depth migration Accordingly, most migration schemes concentrate on solving the difficulties associated with wave extrapolation.

Several different numerical techniques have been used to attempt to develop an accurate 3D prestack depth migration. Generally, both implicit depth extrapolation and explicit depth extrapolation have been used.

Implicit depth extrapolation methods involve solving a linear system of coupled equations. Stability has been one of the most compelling reasons for the use of implicit methods for seismic wavefield extrapolation. However, attempts to use implicit methods have been hindered by the fact that commonly used methods, such as finite-difference migration methods, cannot be extended easily from 2D to 3D. Splitting the depth extrapolation process to extrapolate alternately along the inline (x) and crossline (y) directions is the most practical way to extend implicit extrapolation methods from 2D to 3D. However, splitting results in errors depending significantly on reflector dip and azimuth. Corrections for these errors increase both the computational cost and complexity of implicit depth extrapolation methods.

More recent methods, such as reverse-time migration, may be extended from 2D to 3D relatively easily but are relatively expensive, due to the large number of computations and the large amount of computer memory required.

Explicit methods for seismic wavefield extrapolation are attractive because they require relatively less computations and computer memory. However, explicit methods tend to be unstable. Without special care in their implementation, explicit extrapolation methods cause wavefield energy to grow exponentially with depth, contrary to physical expectations.

One recent technique, Hale-McClellan 3D Prestack Depth Migration (HM 3DPSDM) is an explicit extrapolation method applied to prestack data. The details of HM 3DPSDM is disclosed in publications: Hale, D., "Stable explicit depth extrapolation of seismic wavefields," Geophysics, Vol. 56 No. 11 (November 1991) p. 1770–1777; and Hale, D., "3-D depth migration via McClellan transformations," Geophysics, Vol. 56 No. 11 (November 1991) p. 1778–1785, both of which are incorporated by reference. HM 3DPSDM has been proven to be a cost-effective wavefield imaging technique that has stirred up much hope in the oil industry to provide more accurate images of the subsurface. However, major sources of errors in extrapolation are depth-variable reference slowness and lateral slowness variation. Depth-variable reference slowness refers to the migration velocity having horizontal velocity variations. Lateral slowness variation refers to the migration velocity having lateral velocity variations. Typically, seismic data will contain both these variations and, hence, the process of extrapolation becomes quite complex.

Accordingly, an object of the present invention is to reduce the amount of noise in resolution images of seismic wave propagation caused by depth-variable reference slowness and lateral slowness variations.

A more specific object of the present invention is to provide a method of analyzing seismic data using HM 3DPSDM that enhances the imaging quality of the seismic data and reduce the requirement for small extrapolation depth steps.

A still further object of this invention is to produce a computer program which generates high resolution images of seismic wave propagation.

SUMMARY OF THE INVENTION

According to the present invention the foregoing and other objects are attained in a method for imaging a three-dimensional (3D) seismic data volume containing a plurality of data points having x, y and z coordinates defining a physical location in said seismic data volume, wherein said data points have an associated wave velocity. The method comprises downwardly extrapolating the data corresponding to a particular depth to obtain a desired physical quantity. A series of Li-correction operators is calculated for at least a portion of the depths. The Li-correction operators correspond to a series of reference velocities. Generally, the series of reference velocities are determined by selecting a minimum reference velocity and a maximum reference velocity and a step interval for increasing the reference velocity starting with the minimum reference velocity and continuing until the maximum reference velocity is reached. After the series of Li-correction operators are calculated for a particular depth, they are each applied to the corresponding physical quantity obtained for the same depth thereby obtaining a series of reference physical quantities. Interpolation is then used to obtain a corrected physical quantity by using the series of reference physical quantities, the series of reference velocities and the associated velocity. In a particularly preferred embodiment a series of tapering operators are also calculated for each of the reference velocities and the tapering operators are applied to physical quantities for the corresponding depth when the Li-correction operators are applied.

In another aspect of the invention, an apparatus comprises a computer programmed to carry out the afore described method.

DETAILED DESCRIPTION OF A PREFERRED EMBODIMENT

Figure 1:
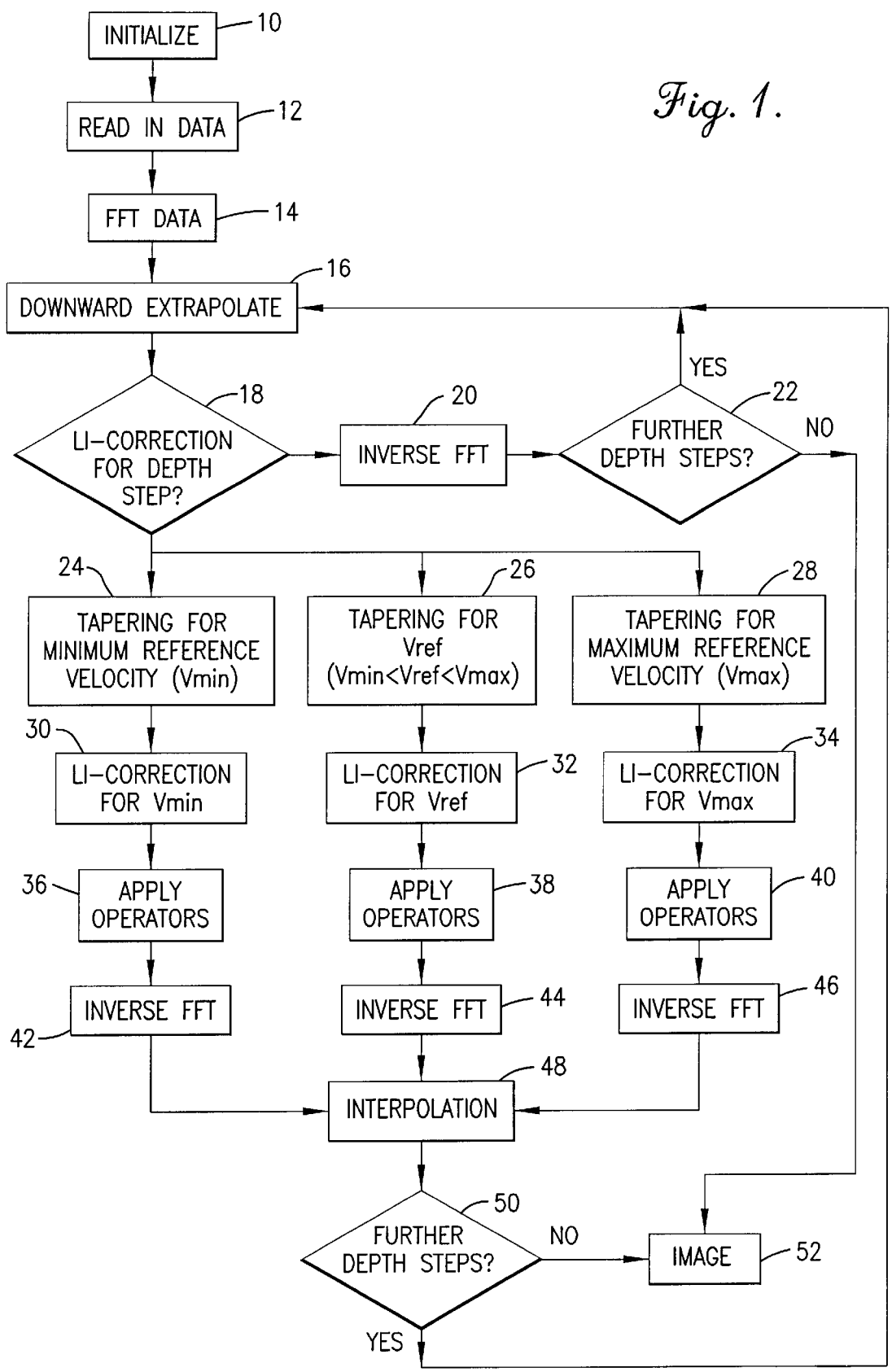
FIG. 1 is a flow chart describing computer programming for a method in accordance with the invention.

The basic data to which this invention is applied is in the form of a spatial sequence of unmigrated seismic time scale traces which have been recorded in a 3D seismic survey, then gathered, digitized and stacked as is known in the art. A first step in processing the real seismic data according to this invention is to set up an earth velocity model for carrying out computations for propagation of a wave equation in a high speed or a massively parallel computer system such as a CRAY T3E or IBM SP2. The earth velocity model involves setting up computer memory locations for holding values of velocity of the subterranean medium as well as locations for holding values of wavefield parameters such as pressure and particle velocity.

In the method according to the invention the wave equation is solved for the physical quantity being measured (p); i.e. particle velocity, acceleration, displacement or pressure. This is accomplished by first preparing the data by performing a Fast Fourier Transform (FFT) so that computing can be carried out in frequency slices. Thus, on parallel computers each processing unit only needs to hold and downwardly extrapolate certain frequency slices of the recorded data and source wavefield. At each depth step, imaging conditions are applied by multiplying the conjugate of the downward extrapolated source data and recording data in the frequency domain, followed by a collective stacking of the convolved data on all processing units. After imaging for all depth steps are finished, a source illumination factor (SIF)—autocorrelation of the extrapolated source data—is applied in order to normalize the migrated image in the postprocessing stage.

Downward extrapolation is preferably carried out by HM 3DPSDM. In order to correct for azimuthal error associated with depth-variable reference slowness and lateral slowness variations, the resulting extrapolated data is then corrected by using Phase Shift Plus Interpolation (PSPI) in combination with Li-correction. PSPI is generally disclosed in Gazdag, J., "Migration of seismic data by phase shift plus interpolation," Geophysics Vol. 49 No. 2 (February 1984) p. 124–131, herein incorporated by reference. PSPI operates by splitting the phase shift expressed in the Fourier Transformed p (P) into two or more distinct operations; thus, the equation for P is solved using each of these phase values. In operation in the current invention, the PSPI is used in combination with Li-correction. Preferably, PSPI is used in combination with both Li-correction and tapering. Tapering corrects for complex velocities that would cause the wavefield energy to go grow unrealistically by tapering such values to zero using a cosine function. Li-correction is applied as disclosed in Meng, Z., "3-D hale-McClellan Prestack Depth Migration with Enhanced Extrapolation Operators", NP-86, 2000 *E&P Technical Symposium,* Sep. 26–27, 2000, Bartlesville Okla. 74004.

Tapering operator and Li-correction operator are calculated for each reference velocity from a preselected minimum reference velocity to a preselected maximum reference velocity. The tapering operator and Li-correction operator are then applied to the value for P determined from the downward extrapolation and the resulting corrected P value undergoes inverse Fast Fourier Transform to obtain reference p values associated with each reference velocity. The final p value is determined by interpolation based on the actual velocity value, reference velocities and reference p values. Generally, the actual velocity and two closest reference velocities are used to interpolate the value for p from the associated reference p values.

While tapering and Li-correction may be carried out for each depth step this is generally not necessary. In a preferred embodiment, the tapering and Li-correction steps are carried out from every second depth step to every tenth depth step and, more preferably from every fourth depth step to every eight depth step.

Referring now to FIG. 1, a flow chart of typical processing steps employed in the practice of this invention are shown. As illustrated in step 10, one starts with initializing the program by setting up computer memory locations and inputting parameters such as, the minimum reference velocity, the maximum reference, velocity, and the depth step interval for performing Li-correction and tapering. Next step 12 is performed wherein seismic data is read into allocated computer memory. This input data includes the best available values for wave velocity in the medium and, also, wavefield values, which are real seismic data that is used in computational grids.

Once the initial steps are performed the input data is processed by Fast Fourier Transformation in step 14. The data is downward extrapolated in the frequency domain by use of HM 3DPSDM in step 16 to determine a value for P. In performing the downward extrapolation, it is recognized that seismic wave propagation involves an essentially unlimited extent of the earth while the number of locations used in the velocity model is necessarily limited by the extent of computer memory available. Accordingly, an edge of the limited model acts as an artificial boundary which is tapered off by use of a cosign function.

After downward extrapolation has been carried out, step 18 determines if Li-correction and tapering are to be carried out for this depth step. If not, then step 20 determines a value for p by inverse FFT of the P value. Step 22 then determines if there are further depth steps. If step 18 determined Li-correction and tapering are to be carried out, then the program advances to parallel blocks 24, 26, and 28 where the tapering operator is determined for the different reference velocities. These steps are followed by the steps in parallel blocks 30, 32 and 34 where Li-correction is carried out for the different reference velocities. While FIG. 1 only illustrates three reference velocities, it should be understood that there will generally be numerous reference velocity and, hence, numerous parallel steps for determination of tapering and Li-correction. The exact number of reference velocities be determined by the value for the minimum reference velocity chosen, the value for the maximum reference velocity chosen, and the size of the step between reference velocities. Smaller reverence velocity steps will enhance the accuracy of the corrections but, naturally, increase the number of computations and amount of computer resources used. In steps 36, 38 and 40 the thus calculated tapering operators and Li-correction operators are applied to the downward extrapolated value for P determined in step 16 to produce reference P values for each reference velocities. These reference P values are inverse FFT to obtain reference p values for each reference velocities in steps 42, 44 and 46. The final corrected p value is obtained in step 48 by interpolation. While the tapering steps 24, 26 and 28, the Li-correction steps 30, 32 and 34, the application of the operators in steps 36, 38 and 40, and the inverse FFT steps 42, 44 and 46 are shown in parallel, it should be understood that these can be carried out in series, with each reference p value being calculated one at a time.

Step 50 determines if all depth steps have been processed. Once all the depth steps have been carried out the final image is produced in step 52.

Figure 2:
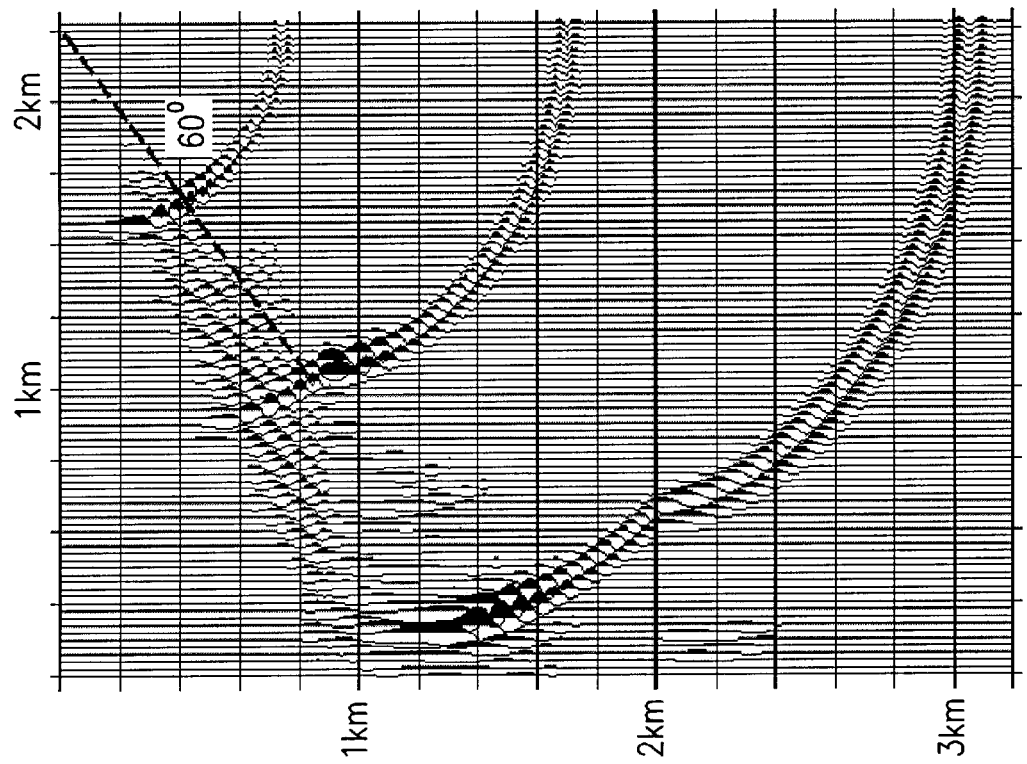
FIG. 2 is a graphical representation of a 3D HMPSDM impulse response.

FIG. 2 is a graphical representation of a 3D HMPSDM impulse response. A 3-layered model with velocities 1500, 4500 and 3000 m/s and interfaces at 800 m and 2000 m was used to carry out this graphical representation and those in FIG. 3 and FIG. 4. 3D HMPSDM gave clean results at small dips but the image is noisy at large dips.

Figure 3:
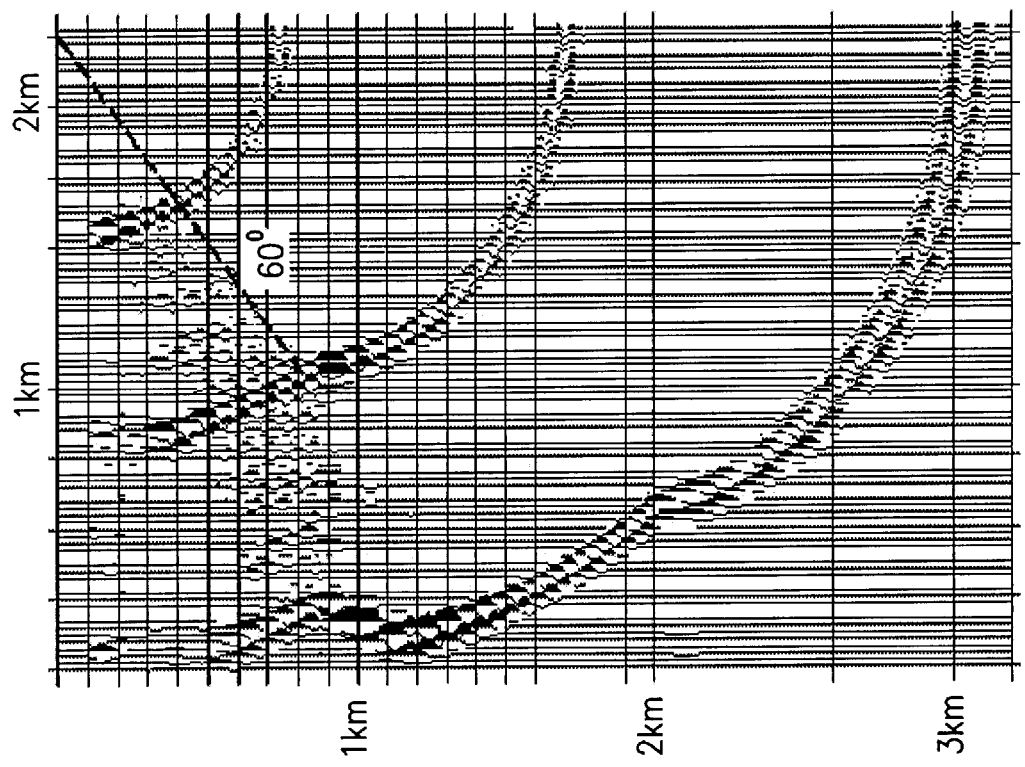
FIG. 3 is a graphical representation of a 3D HMPSDM impulse response utilizing PSPI Li-Correction in accordance with the invention.

FIG. 3 is a graphical representation of a 3D HMPSDM impulse response utilizing PSPI Li-Correction in accordance with the invention. The noise at large dips has been improved over 3D HMPSDM alone and has, generally, been push to even larger dips.

Figure 4:
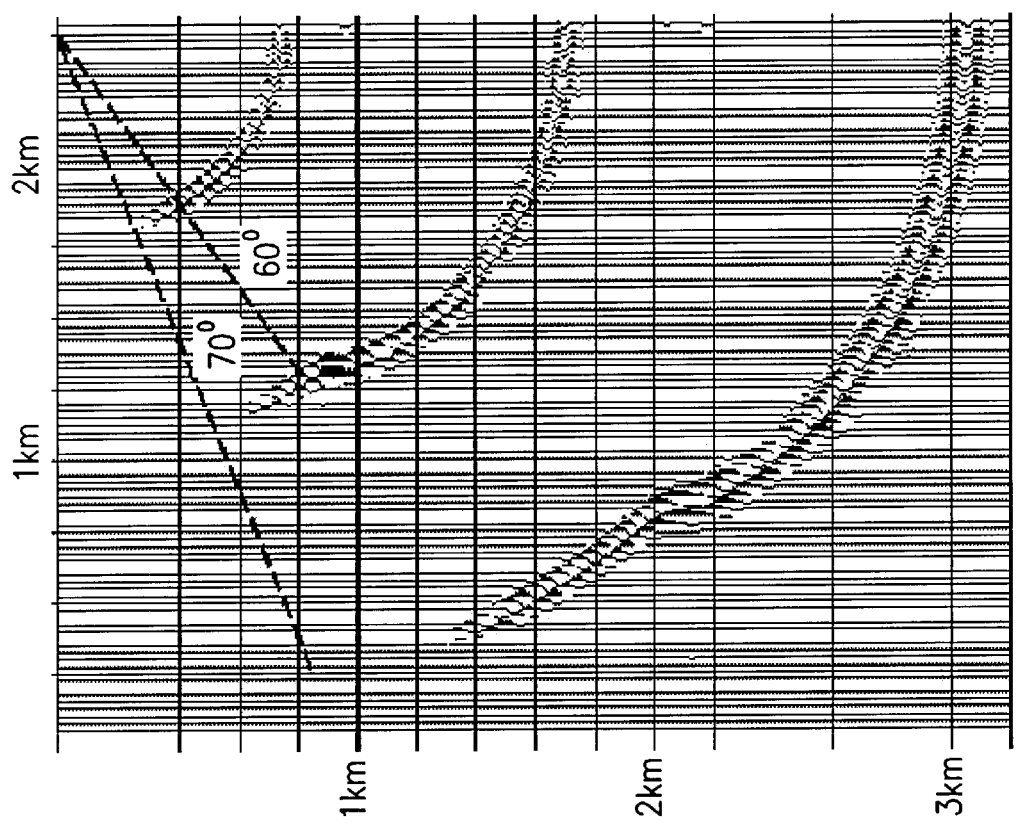
FIG. 4 is a graphical representation of a 3D HMPSDM impulse response utilizing PSPI Li-Correction and tapering in accordance with the invention.

FIG. 4 is a graphical representation of a 3D HMPSDM impulse response utilizing PSPI Li-Correction and tapering in accordance with the invention. The tapering plus Li-correction results in very little noise and an improved representation over 3D HMPSDM alone or with Li-correction.

In this disclosure, there is shown and described only a preferred embodiment of the invention, but, as aforementioned, it is to be understood that the invention is capable of use in various other combinations and environments and is capable of changes or modifications within the scope of the inventive concept as expressed herein.

That which is claimed is:

1. A computer implemented method for imaging a three-dimensional (3D) seismic data volume containing a plurality of data points having x, y and z coordinates defining a physical location in said seismic data volume, wherein said data points have an associated velocity, said method comprising:

(a) downwardly extrapolating the data corresponding to a particular depth to obtain a desired physical quantity;

(b) calculating a series of Li-correction operators corresponding to a series of reference velocities for at least a portion of the depths;

(c) applying each of said series of Li-correction operators to the corresponding physical quantity obtained for said depth thereby obtaining a series of reference physical quantities;

(d) obtaining a corrected physical quantity by performing interpolation using said series of reference physical quantities, said series of reference velocities and said associated velocity.

2. A method in accordance with claim 1, wherein said series of reference velocities are determined by selecting a minimum reference velocity and a maximum reference velocity and a step interval for increasing the reference velocity starting with the minimum reference velocity and continuing until the maximum reference velocity is reached.

3. A method in accordance with claim 1, further comprising calculating a series of tapering operators corresponding to said series of reference velocities for the same portion of the depths as the Li-correction operators and applying both said series of Li-correction operators and said series of tapering operators to the corresponding physical quantities in step (d).

4. An apparatus for imaging a physical property of three-dimensional (3D) seismic data volume containing a plurality of data points having x, y and z coordinates defining a physical location in said seismic data volume, wherein said data points have an associated velocity, said apparatus comprising:

a computer programmed for:

(i) storing said 3D seismic data volume;

(ii) downwardly extrapolating the data corresponding to a particular depth to obtain a desired physical quantity;

(iii) calculating a series of Li-correction operators corresponding to a series of reference velocities for at least a portion of the depths;

(iv) applying each of said series of Li-correction operators to the corresponding physical quantity obtained for said depth thereby obtaining a series of reference physical quantities;

(v) obtaining a corrected physical quantity by performing interpolation using said series of reference physical quantities, said series of reference velocities and said associated velocity.

5. An apparatus in accordance with claim 4, wherein said series of reference velocities are determined by selecting a minimum reference velocity and a maximum reference velocity and a step interval for increasing the reference velocity starting with the minimum reference velocity and continuing until the maximum reference velocity is reached.

6. An apparatus in accordance with claim 4, wherein said computer is additionally programmed to calculate a series of tapering operators corresponding to said series of reference velocities for the same portion of the depths as the Li-correction operators and apply both said series of Li-correction operators and said series of tapering operators to the corresponding physical quantities in step (iv).

* * * * *